United States Patent [19]
Markham et al.

[11] Patent Number: 4,843,980

[45] Date of Patent: Jul. 4, 1989

[54] COMPOSITION FOR USE IN REDUCING AIR CONTAMINANTS FROM COMBUSTION EFFLUENTS

[75] Inventors: Lucille Markham, 7142 Cross Rd., Citrus Heights, Calif. 95610; Steven J. Bortz, Irvine, Calif.

[73] Assignees: Lucille Markham, Citrus Heights, Calif.; The University of Southern Mississippi, Hattiesburg, Miss.; Frontend International Technologies, Inc., Colville, Wash.; Parsons & Crowther, Salt Lake City, Utah

[21] Appl. No.: 186,443

[22] Filed: Apr. 26, 1988

[51] Int. Cl.[4] ............................................. F23B 7/00
[52] U.S. Cl. ..................................... 110/342; 110/345; 423/239
[58] Field of Search ............... 110/342, 343, 344, 345, 100/346, 347; 423/239, 244

[56] References Cited

U.S. PATENT DOCUMENTS

| | | | |
|---|---|---|---|
| 3,974,783 | 8/1976 | Flynn | 110/342 X |
| 4,173,454 | 11/1979 | Heins | 110/342 X |
| 4,312,280 | 1/1982 | Shearer et al. | 110/342 X |
| 4,391,207 | 7/1983 | Petersen | 110/342 X |
| 4,503,785 | 3/1985 | Scacca | 110/345 X |
| 4,547,351 | 10/1985 | Imi et al. | 110/342 X |
| 4,588,568 | 5/1986 | Pollmann et al. | 110/345 X |
| 4,613,487 | 9/1986 | Yoon et al. | 110/345 X |
| 4,639,209 | 1/1987 | Grethe | 110/345 X |
| 4,645,654 | 2/1987 | Basczak | 110/345 X |
| 4,741,278 | 5/1988 | Franke et al. | 110/342 |

*Primary Examiner*—Henry C. Yuen
*Attorney, Agent, or Firm*—Mark I. Feldman

[57] ABSTRACT

An effective process is provided for cleanly and safely combusting coal or other carbonaceous material in a manner which enhances the environment by reducing emission of pollutants. In order to reduce nitrogen oxide and sulfur oxide emissions during combustion, combustion is carried out in the presence of one or more additives comprising an alkali metal salt, such as sodium chloride. To further enhance the reaction and removal of sulfur oxides and nitrogen oxides, the additive can include an iron-containing compound, such as iron oxide, and/or a metal oxide, such as manganese oxide.

9 Claims, 3 Drawing Sheets

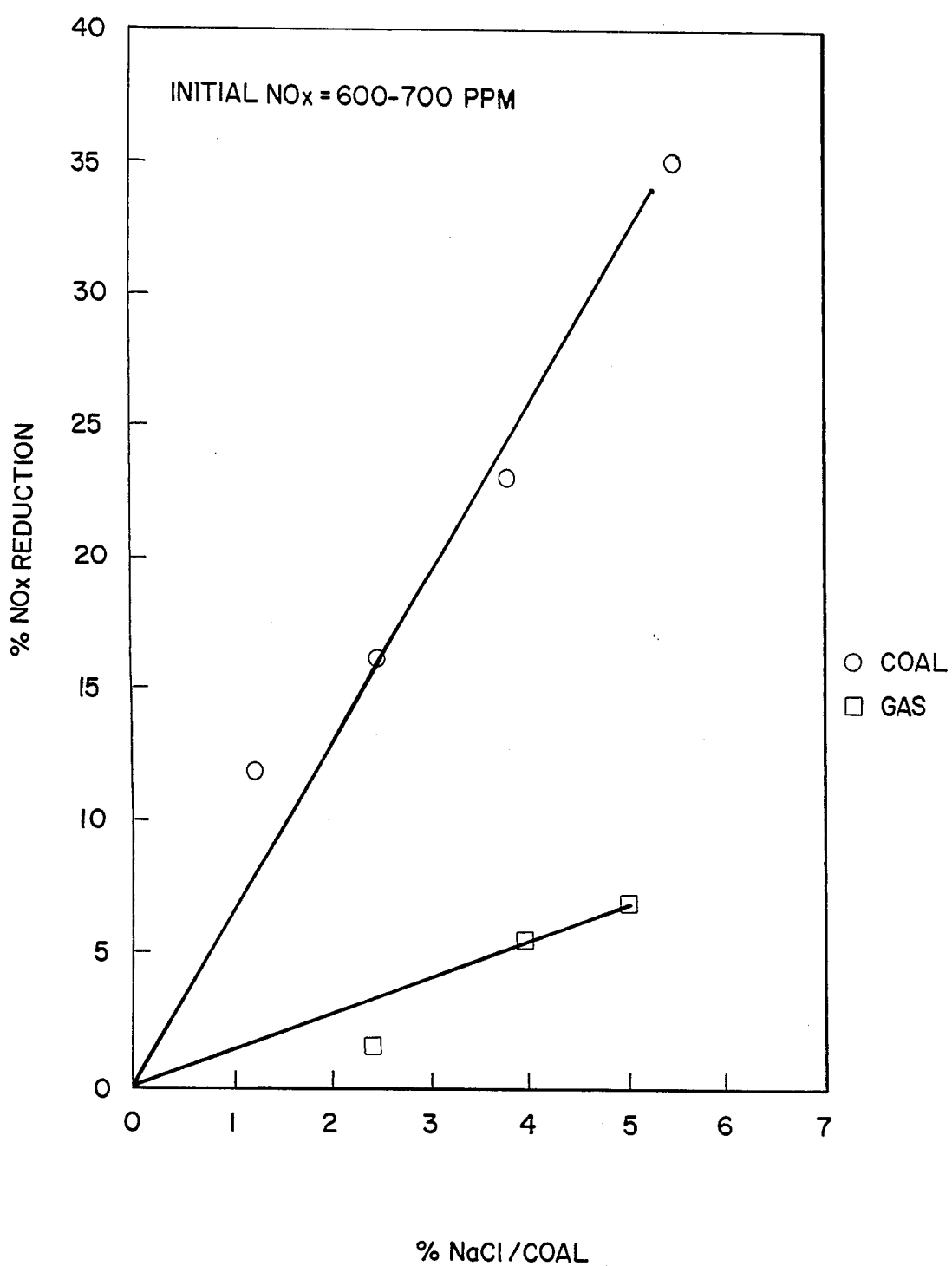
FIG-2. NOx REDUCTION WITH NaCl.

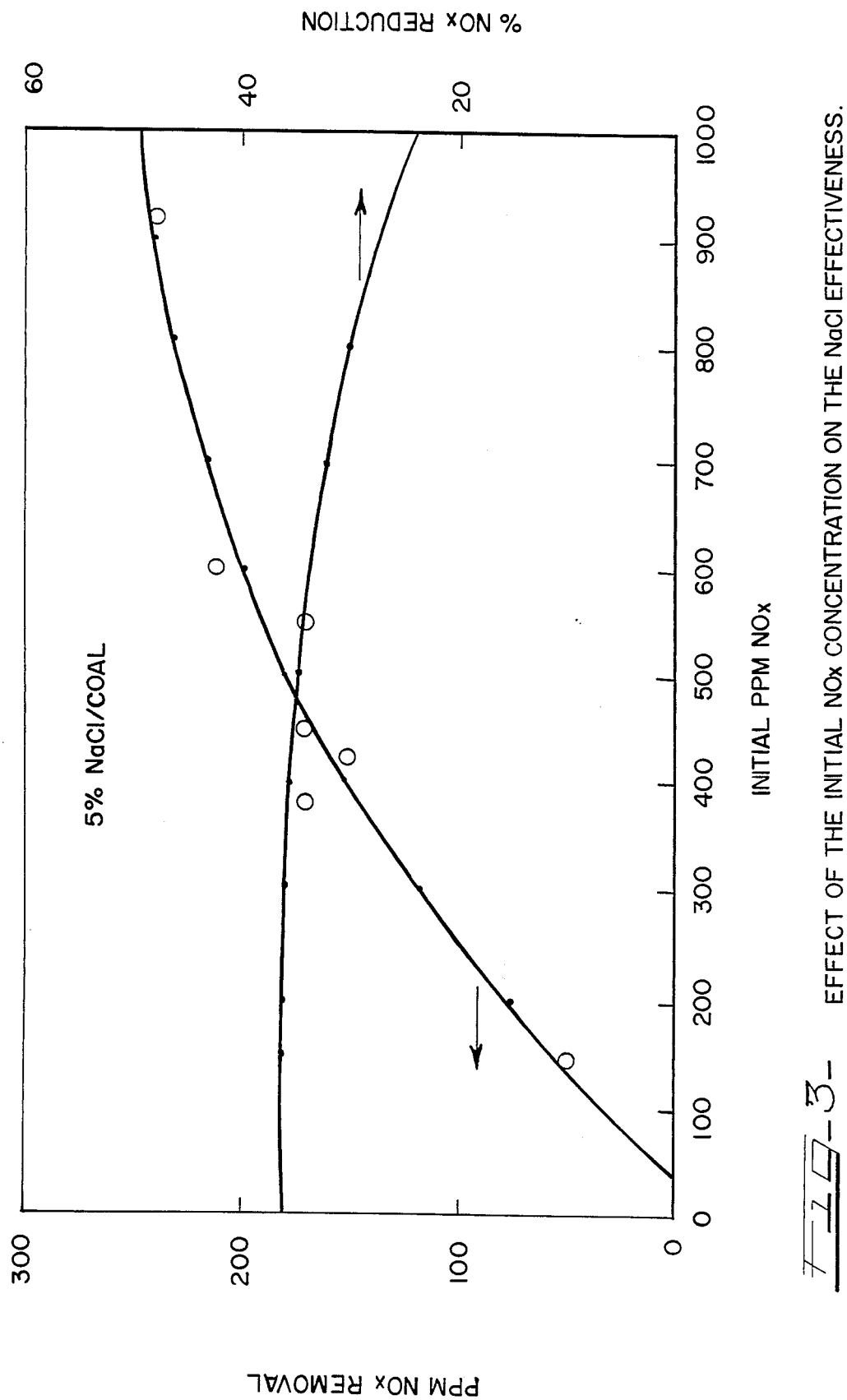
FIG. 3 — EFFECT OF THE INITIAL NOx CONCENTRATION ON THE NaCl EFFECTIVENESS.

COMPOSITION FOR USE IN REDUCING AIR CONTAMINANTS FROM COMBUSTION EFFLUENTS

BACKGROUND OF THE INVENTION

This invention relates to flue gas cleanup and, more particularly, to removing nitrogen oxides and sulfur oxides from a combustion effluents emitted during the direct combustion of coal.

Flue gases emitted during the direct combustion of coal often contain undesirable levels of sulfur oxides (SOx) and nitrogen oxides (NOx) which, if untreated, might pollute the atmosphere. Sulfur oxides in the presence of water can form sulfuric acid causing acid rain. Nitrogen oxides may cause smog by photochemical reaction with hydrocarbons in the atmosphere.

Over the years, various methods have been suggested for controlling and/or removing sulfur oxide and/or nitrogen oxide emissions. Methods for removal of nitrogen oxides include low excess air, staged combustion, reburning, ammonia injection, and selective catalytic combustion. The typical percent removal of nitrogen oxides by these methods range from 30% to 90%.

Control techniques for nitrogen oxides can be separated into those which utilize combustion modifications to convert the nitrogen oxides to nitrogen and those which inject ammonia either into the furnace or into a cataytic reactor to reduce the nitrogen oxides concentration. Although combustion modifications are typically quite inexpensive, they are usually limited in the amount of reduction which can be achieved to about 50%. While injection of ammonia into the flue gas stream can be effective, very careful control of the injection temperature is required to achieve a high conversion efficiency. In an industrial or utility situation, this control can be difficult to maintain.

Generally, the removal of sulfur oxides can be accomplished with the injection of dry calcium or the use of varous complex expensive equipment installed downstream of the boiler. Calcium can also be obtained from calcium carbonates or calcium hydroxides and can be injected directly into the combustion chamber to absorb sulfur oxides. However, this is relatively inefficient, requiring large amounts of calcium. In catalytic cracking units, sulfur oxide control processes usually occur in the regenerator. In one widely used process, sulfur oxides are captured in the regenerator with sulfur oxide-capturing acceptors and subsequently converted to hydrogen sulfide in the reactor and the hydrogen sulfide is withdrawn with the product stream from the reactor and treated in a sulfur recovery plant.

Flue gas streams discharged from regenerators, power plants or other combustors are commonly directed through one or more dedusters, such as flue gas scrubbers, electrostatic precipitators, cyclones bag houses, granular bed filters, or other filters, in order to remove particulates from the glue gas stream.

Typifying prior art methods for controlling sulfur oxide and/or nitrogen oxide emissions, or other pollutants, prior art uses of sodium chloride, iron oxides, or manganese-containing compounds, as well as other prior art processes, equipment, and compositions, are those described in U.S. Pat. Nos. 621,884; 1,150,839; 1,555,590; 1,895,724; 2,014,686; 2,083,894; 2,493,218; 2,493,911; 2,522,426; 2,575,520; 2,863,824; 2,992,895; 3,023,836; 3,068,627; 3,251,649; 3,264,801; 3,320,906; 3,369,504; 3,389,829; 3,501,897; 3,723,598; 3,755,535; 3,760,565; 3,778,501; 3,823,676; 3,832,445; 3,835,031; 3,840,643; 3,846,536; 3,892,677; 3,987,146; 4,001,376; 4,006,066; 4,014,981; 4,039,478; 4,115,518; 4,153,534; 4,153,535; 4,164,545; 4,181,705; 4,206,039; 4,218,344; 4,221,677; 4,233,175; 4,233,276; 4,238,317; 4,241,033; 4,254,616; 4,258,020; 4,267,072; 4,300,997; 4,323,542; 4,325,811; 4,369,109; 4,369,130; 4,376,103; 4,381,991; 4,405,443; 4,423,019; 4,443,419; 4,500,501; 4,540,554; and 4,552,734.

These prior art methods, equipment, and compositions have met with varying degress of success.

Another by-product of burning coal in particular is coal ash. The ash is a mixture of several phases of inorganic residues that accompany the coal. Because of its complexity and its insolubility, the toxicological, chemical, and morphological properties of the ash are not easily evaluated and new product development using coal ash has consequently been inhibited. Consequently, plants that process coal are also accumulating huge ash piles which becomes sources of both soil and water pollution. Significant mantenance expenses are incurred even though the ash is a potential source of valuable minerals.

It is, therefore, desirable to provide an improved process for cleanly burning coal and minimizing pollution, which overcomes most, if not all, of the preceding problems.

SUMMARY OF THE INVENTION

An improved process is provided to efficiently, effectively, and cleanly burn carbonaceous material while minimizing emission of pollution and contaminants into the atmosphere. While the preferred carbonaceous material is coal, including lignite, and peat, other substantially solid carbonaceous materials can be effectively and cleanly burned with the novel combustion process, such as oil shale, tar sands, uintaite (gilsonite), and biomass. Furthermore, the novel combustion process can also be effectively used to cleanly burn liquid and/or gaseous fuels.

In the process, the carbonaceous material is substantially combusted while emitting effluent gases containing both nitrogen oxides (NOx) and sulfur oxides (SOx). In order to purify the effluent gases, the nitrogen oxides and sulfur oxides are reacted to molecular nitrogen and sulfur oxides, respectively, with one or more Group la alkali metal salts, such as sodium chloride, potassium chloride, lithium chloride, calcium chloride, sodium bromide, and/or potassium bromide.

The carbonaceous material can be contacted with or combusted in the presence of the alkali metal salt. In order to enhance the reaction and removal of nitrogen oxides and sulfur oxides, the carbonaceous material can also be combusted with an oxide of manganese, zinc, copper, nickel, calcium and/or cobalt, and/or the nitrogen oxides and sulfur oxides can be further reacted with an iron-containing compound, such as ferric oxide (iron oxide), ferrous oxide (FeO) or an iron manganese alloy (FeMn).

In the preferred process, coal is directly combusted with a flame in the presence of air to produce heat while simultaneously emitting effluent combustion gases comprising nitrogen oxides and sulfur oxides and the combustion gases are substantially purified, treated, and upgraded by substantially removing and reducing the nitrogen oxides and sulfur oxides with sodium chloride. The sodium chloride can be sprayed onto the base of the flame, injected into the air in the reaction (combustion) zone about the flame, or mixed with the coal. The coal can be combusted in a stoker or pulverized coal furnace.

In order to further purify the combustion gases and enhance the removal of nitrogen oxides and sodium oxides, the coal can be combusted in the presence of an oxide of one or more metals such as manganese, zinc, copper, nickel, calcium, and cobalt, and/or an iron-containing compound. More preferably, the coal is combusted in the presence of a composition comprising by weight: from about 20% to 60% sodium chloride, from about 5% to about 50% manganese oxide, and from about 10% to about 50% iron oxide.

In addition to reducing SOx and NOx emissions, the use of the above additives may change the physical and chemical properties of ash resulting from the combustion process, particularly coal ash. A substantial amount of the resulting ash may be grittier and of a larger particle size. The resultant ash could be useful.

As used in this application the terms "sulfur oxide" and "sulfur oxides" means sulfur dioxide and/or sulfur trioxide.

The terms "SOx" and "$SO_x$" as used herein means sulfur oxide.

The terms "nitrogen oxide" "nitrogen oxides" and "nitrous oxides" as used herein means nitric oxide (NO) and/or nitrogen dioxide ($NO_2$).

The terms "NOx" and "$NO_x$" as used herein mean nitrogen oxide and/or nitrogen dioxide.

A more detailed explanation of the invention is provided in the following description and appended claims taken in conjunction with the accompanying drawings.

BRIEF DESCRIPTION OF THE DRAWINGS

FIG. 2 is a chart showing NOx reduction with sodium chloride; and

FIG. 3 is a chart illustrating the effect of initial NOx concentration on sodium chloride effectiveness.

DETAILED DESCRIPTION OF THE PREFERRED EMBODIMENT

Figure 1:
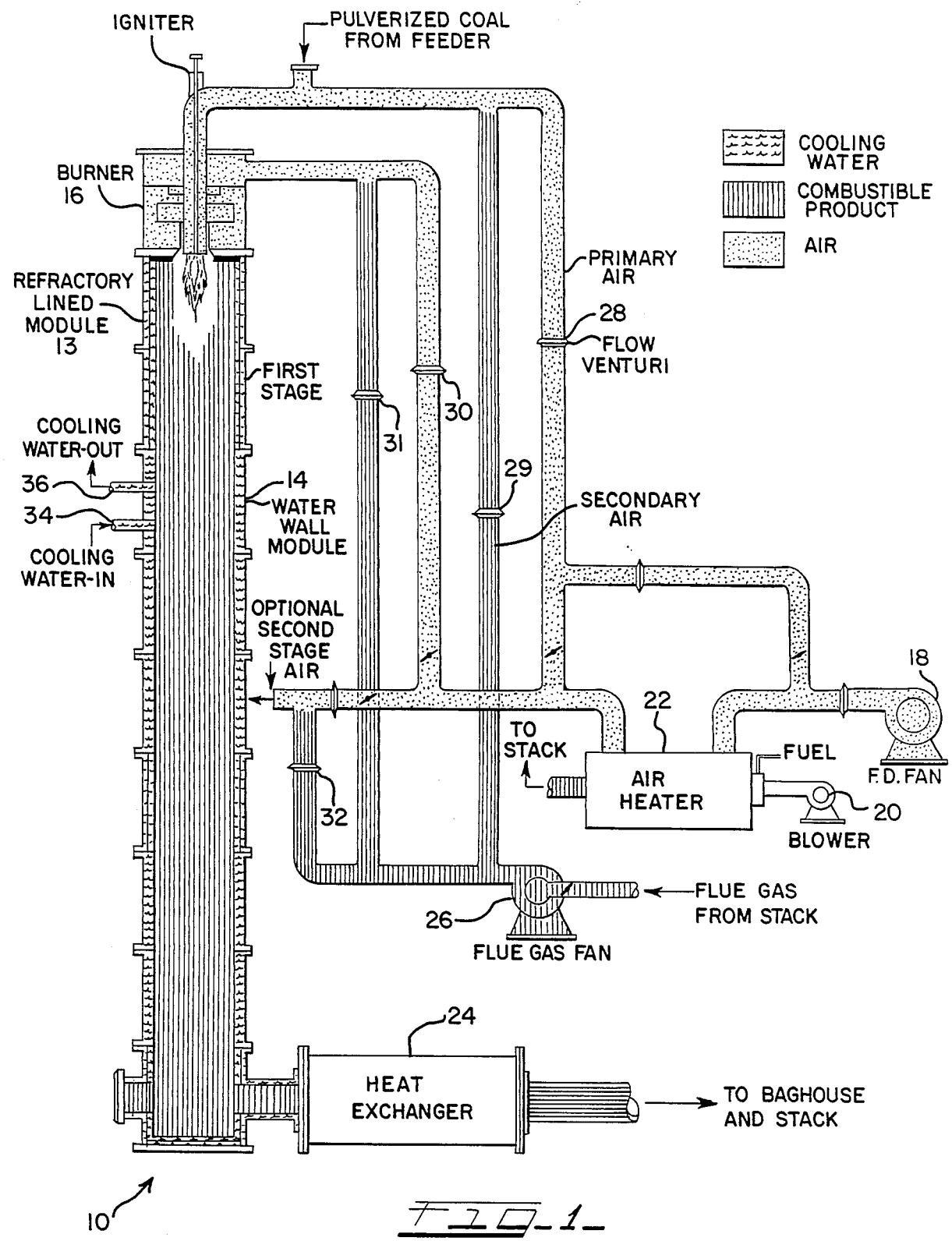
FIG. 1 is a diagram of a pulverized coal combustion facility.

Pollution control additives are useful in the combustion of coal and other carbonaceous materials. The composition of the pollution control additives, which are also referred to as Induco B, comprise three components. The first component (A) is the primary component and comprises a Group 1a alkali metal salt. The preferred alkali metal salt is sodium chloride, which is also referred to as common table salt. Other alkali metal salts can be useful, such as: potassium chloride, sodium bromide, lithium bromide, or lithium chloride. In some situations, it may be desirable that the pollution control additive consist only of an alkali metal salt or more than one alkali metal salt.

The second additive or component (B) comprises an iron-containing compound. The preferred iron-containing compound iron oxide or ferric oxide ($Fe_2O_3$). Other iron-containing compounds can also be useful, such as ferrous oxide (FeO) and $Fe_3O_4$, or an iron manganese alloy (FEMn).

The third additive or component (C) comprises a metal oxide. The preferred metal oxide is an oxide of manganese, such as manganese dioxide ($MnO_2$). Manganese (II) oxide (MnO) and $Mn_3O_4$ can also be useful. Other metal oxides can also be useful such as: zinc oxide, copper oxide, nickel oxide, calcium oxide, and cobalt oxide.

Although sodium chloride is most effective in reducing the SOx and NOx levels of combustion effluents, the components (additives) can be used in concert to achieve further emission reduction and effect the chemical and physcial changes in the resulting ash. The chemical and physical changes in the ash produce an ash can be grittier and more porous than the typical fly ash resulting from combustion of coal and the like.

The additive composition is a physical mixture of the additives (components). The composition is granular in nature and exists typically as fine grains, powder and the like. Generally, each componet is present is the composition is an amount sufficient to be effective in reducing both SOx and NOx emissions from combustion effluents. The exact amount of each component can depend on the particular type of coal being burned.

The iron oxide component can range from about 10% to about 50% by weight of the three components (additives). The sodium chloride can range from about 20% to about 60% by weight of the three components (additives). The oxide of manganese can range from about 5% to about 50% by weight of the three components (additives). The ratio of the three components (additives) of iron oxide to sodium chloride to an oxide of manganese is preferably about 25:50:25.

Several processes exist which use combustion materials such as coal. These include direct combustion processes, gasification, liquefaction and carbonization and coking process. The composition is intended primarly for use in a variety of direct combustion processes. Direct combustion is defined as combustion which occurs in or around the flame.

Direct combustion processes include, for example, pulverized coal combusters, fluidized and fixed bed combustors, stokers and the like. Pulverized coal combustors are generally characterized by flame temperatures of about 1750 degrees K and a typical residence time of 1 second. The particle size of coal used in pulverized coal processes ranges from about 10-100 microns. Stoker furnaces are generally characterized by a flame temperature of about 1750 degrees K and a typical residence time of about 3000 to 5000 seconds. The particle size of coal typically ranges from about 1-5 cm.

Generally, it is preferred to react the additives (composition) in the flame zone during combustion. The flame zone is generally encompassed by the firebox. The desired effect is to add the additives to the firebox or burn area such that the additive composition could react with the hot gases present. This can be accomplished, for example, by placing the additives in contact with the combustion materials or injecting the additives in the reaction zone (combustion zone) above the combustion materials.

Excellent reduction of SOx and NOx occurs when the additive composition is placed in contact with the combustion materials during the combustion process. The additives can be mixed directly with the combustion materials, or top dressed on the combustion materials, i.e., placed on top of the combustion materials. In addition, emission reduction apparently increases as combustion efficiency increases, i.e., increasing the temperature and lowering the $O_2$ concentration. The additive composition may increase the combustion temperature.

Both lab scale and pilot scale tests were conducted with various additives. Tests conducted included the collection of gases from coal combustion and analysis of ash resulting from the combustion. Pilot scale tests were directed to analyzing combustion effluents, specifically the effect of the additive on nitrogen oxides and sulfur oxides produced in coal flames.

The first pilot scale tests were conducted with a various temperatures ranging from 1200 degrees F to 2800 degrees F and at an additive to coal weight ratio ranging from about 1.4 to 17%. The additive was both injected and mixed with the coal with no top dressing. These tests indicated that the additive was effective in reducing both NOx and SOx emissions.

Fly ash analysis indicates the presence of sodium sulfate. The formation of sodium sulfate may require the Na+ provided by the sodium salt employed as well as the presence of the $MnO_2$ employed in the composition. The $MnO_2$ may act as a catalyst in the sodium sulfate production. The formation of $FeS_x$ found in ash samples analyzed apparently may be attributed to the $Fe_3+$ supplied by the composition.

The above analysis is not intended to bind the invention to any particular theory and is one explanation of how the additive composition achieves the observed results. However, the tests indicate that each component (additives) can be useful in reducing SOx and NOx in combustion effluents.

These and other aspects of the invention are illustrated in greater detail in the following examples. Since the examples are for the purpose of illustrating the invention, they shall not be construed as limiting the invention. Those skilled in the art should be able to recognize some variations in how to make and use the invention and it is intended to encompass those variations within the spirit and scope of the present invention.

EXAMPLE 1

Initial tests were conducted on two types of high sulfur coals having a sulfur content of at least 1%. The first coal type was a high volatile bituminous coal (KCER-71159); the second coal type was a medium volatile bituminous coal (PSOC-723).

Coal analysis was conducted by placing 5 gram samples into quartz crucibles. The cricibles were placed in a Fisher Coal Analyzer model 490 and heated at various temperatures for various times. The results of the analysis are given in Tables 1 and 2.

TABLE 1

| Coal Type | % Moisture | % Ash | % Fixed Carbon | % Volatile Matter |
|---|---|---|---|---|
| KCER-71159 | 1.84 | 26.53 | 38.80 | 32.80 |
| PSOC-723 | 1.36 | 13.48 | 58.45 | 26.70 |

TABLE 2

| Coal Type | % C | % H | % N | % S | % Cl | % O |
|---|---|---|---|---|---|---|
| KCER-71159 | 56.11 | 4.25 | 1.40 | 9.87 | — | 1.94 |
| PSOC-723 | 71.85 | 4.42 | 1.06 | 3.86 | 0.04 | 3.93 |

EXAMPLE 2

Combustion tests were conducted on the coal samples described in Example 1. The tests were conducted using the coal samples with and without the additive. The additive composition was physically mixed together to give a roughly 25:50:25 mixture of $Fe_2O_3$:NaCl:$MnO_2$.

X-ray diffraction measurements of the additive also indicated the presence of some minor amounts of quartz in the composition. This probably resulted in some variations in the additive samples.

Combustion tests on the two coal samples were conducted by preparing 0.5 gram samples of the coal. Where additive was included in the sample, a ratio of 40 parts by weight of coal to 1 part by weight of additive was used.

The samples were combusted in quartz tubes which were heated to 850 degrees C. in a tube furnace (Lindberg type 55035). Air flowed through the tubes at a flow-rate of 100 ml/min, and the effluent from the tubes was collected over 10 minutes in rubber balloons. The balloons were then detached from the equipment and the contents analyzed within 2 minutes by combined gas chromatography/mass spectrometry by injecting 1.0 ml portions (aliquots) onto Super Q (Alltech & Associates, Bloomfield, Ill.) gas chromatography columns (2 mm × 4 feet). Helium was used as the carrier gas with a column flow-rate of 30 ml/min. A Hewlett-Packard Model #5985B GC/mass spectrometer was adjusted to scan the mass range of 20 to 200 amu. Chromatographic peaks arising from hydrogen sulfide and sulfur dioxide were analyzed and the results are depicted in Table 3.

TABLE 3

| Sample | Coal Type | $H_2S$ | $SO_2$ |
|---|---|---|---|
| A | KCER-71159 | 2,132 | 112.239 |
| B | KCER-71159 | 2,474 | 140.930 |
| C | KCER-71159 | 1,986 | 131.627 |
| D | KCER-71159 | 2,132 | 27.123 |
| E | KCER-71159 | 2,922 | 65.398 |
| F | KCER-71159 | 3,181 | 58.419 |
| G | PSOC-723 | 1,178 | 16.997 |
| H | PSOC-723 | 979 | 13.376 |
| I | PSOC-723 | 857 | 21.831 |
| J | PSOC-723 | 1,195 | 184 |
| K | PSOC-723 | 724 | — |
| L | PSOC-723 | 1,910 | 9.571 |

Untreated coal samples (A-C and G-I) indicated variation in the sulfur dioxide and hydrogen sulfide levels of 11% to 23% relative sample standard deviation. This was considered a reasonable variation considering the small 0.5 gram sample sizes and the hererogenous nature of coal. The treated coal samples (D-F and J-L) indicated a relative sample standard deviation of 20 to 133%. This probably arose form the differing densities of coal and the additive. It is probable that due to the mixing procedure of coal and additive, some aliquots may not have contained the expected level of additive.

The average of the sulfur dioxide emission from PSOC-723 decreased from 17,400 to 3,200 ppm (a 5.4-fold decrease); the average of sulfur dioxide from KCER-71159 decreased from 128,000 to 50,400 ppm(a 2.5-fold decrease).

EXAMPLE 3

Tests were conducted using finely powdered pure sulfur ($S_8$) in combination with additive prepared substantially according to Example 1 and each component of the additive individually. Finely powdered analytical grades of the individual components were used for the tests. The makeup of the test samples are given in Table 4.

TABLE 4

| Sample | S₈ | Additive | Fe₂O₃ | NaCl | MnO₂ | CaCO₃ |
|---|---|---|---|---|---|---|
| A | 1 | 1 | — | — | — | — |
| B | 1 | 1 | — | — | — | — |
| C | 1 | — | — | 1 | — | — |
| D | 1 | — | — | — | — | 1 |
| E | 1 | — | 1 | — | — | — |
| F | 1 | — | — | — | 1 | — |

Each sample in Table 4 was heated to a temperature of 1273 degrees K. The resulting ash was analyzed by X-ray diffraction (XRD) techniques using Mo radiation having a wavelength of 0.709 A. The samples were scanned by XRD from the two-theta angle of 4.00 degrees to 30.00 degrees with stepping increments of 0.05 degrees two-theta. Phase identification of ash was made by a computer search of the Joint Committee Powdered Diffraction Systems (JCPDS) Database. The results are given in Table 5.

TABLE 5

| Sample | Phases Identified |
|---|---|
| A | $Fe_2O_4$, $Na_2O$, $Na_2MnCl_4$, $Fe_2O_3$, $Fe_{12}S_{11}O_{51}$, $MnSO_3$, $Na_{10}Fe_{16}O_{29}$, $MnO_2$, $FeS$, $Fe_{1-x}S$ |
| B | $NaCl$, $MnFe_2O_4$, $MnS$, $Mn_2O_3$, $Na_2O$, $Na_2S_2O_4$, $Fe_2O_3$, $Mn_2Mn(SO_4)_2$ |
| C | $NaCl$, $Na_2O$ |
| D | $CaCo_3$ |
| E | $Fe_3O_4$, $Fe_{1-x}S$, $Fe_2O_3$ |
| F | $Mn_3O_4$, $Mn_2O_3$, $MnSO.4(O_2).6$, $MnSO.6O_3$, $MnS_2$ |

As indicated, sulfur is apparently absorbed by metal oxides, molecularly rearranged at high temperature, forming a metal sulfide or sulfate in the ash. Although NaCl does not indicate any sulfur emission reduction in its individual capacity (Sample C), sodium sulfates were formed in one of the S₈/additive samples (Sample B), suggesting a reaction between NaCl and S₈.

EXAMPLE 4

The additives were tested with coal in a $0.25 \times 10^6$ Btu/hr lab scale stoker furnace. The stoker furnace. The stoker was an underfeed unit with coal pushed through a pipe from underneath onto the center of the grate. The coal was pushed radially outward as it burns. Ash, unburned coal, etc. was pushed off the edge of the grate into an ash pit. Combustion air was supplied at the grate and above the coal bed as lower overfire air (LOFA). Coal input into the furnace was approximately 20 lb/hr. Excess O₂ in the flue gases was nominally about 10% to achieve high combustion efficiency.

EXAMPLE 5

Additives were prepared substantially in accordance with Example 1 was mixed with coal to weight percents of 10 percent and 5 percent. The coal and the additive was fed into the stoker as described in Example 4 at about 20 lb/hr. The results are given Tables 6 and 7.

TABLE 6

| Test | Exhaust Temp C. | Additive % | O₂ | NO | CO | CO₂ | SO₂ | Normalized to 3% O₂ ppm SO₂ | NOx |
|---|---|---|---|---|---|---|---|---|---|
| 1 | 720 | — | 9.0 | 185 | 40 | 10.0 | 660 | (990) | (277) |
| 2 | 718 | — | 11.3 | 120 | 1050 | 7.2 | 620 | (1132) | (218) |
| 3 | 720 | 10 | 13.5 | 62 | 2000 | 5.2 | 360 | (800) | (136) |
| 4 | 660 | 10 | 10.9 | 100 | 1500 | 7.5 | 460 | (813) | (176) |
| 5 | 630 | 10 | 9.8 | 85 | 1200 | 8.5 | 320 | (508) | (134) |
| 6 | 670 | — | 11.2 | 112 | 1000 | 7.0 | 550 | (1005) | (203) |
| 7 | 720 | 5 | 10.5 | 100 | 500 | 8.0 | 440 | (764) | (174) |
| 8 | 740 | 5 | 8.5 | 105 | 500 | 11.5 | 410 | (590) | (151) |

TABLE 7

| Additive | O₂ | Percent SO₂ Average Removal | Percent NOx Average Removal |
|---|---|---|---|
| 10 | 10.9 | 28 | 19 |
| 10 | 9.8 | 55 | 38 |
| 5 | 10.5 | 23 | 14 |
| 5 | 9.8 | 41 | 25 |

EXAMPLE 6

Additive prepared substantially according to Example 1 was tested in the stoker furnace described in Example 4 by injecting the additive into the air stream at various heights above the bed. The results are given in Tables 8 and 9.

TABLE 8

| Test | Exhaust Temp C. | Injection Point | Additive % | O₂ | NO | CO | CO₂ | SO₂ | Normalized to 3% O₂ ppm SO₂ | NOx |
|---|---|---|---|---|---|---|---|---|---|---|
| 1 | 604 | — | — | 11.2 | 120 | 600 | 7.5 | 600 | (1096) | (218) |
| 2 | 550 | — | — | 11.0 | 120 | 350 | 7.5 | 560 | (1019) | (218) |
| 3 | 550 | 4 | 10 | 10.2 | 120 | 150 | 8.6 | 490 | (810) | (198) |
| 4 | | 7 | 10 | 12.0 | 105 | 180 | 6.8 | 425 | (850) | (210) |
| 5 | | 6 | 10 | 12.2 | 95 | 700 | 7.0 | 440 | (880) | (190) |

TABLE 9

| Additive % | Height inches above bed | O₂ | SO₂ Average % Removal | NOx Average % Removal |
|---|---|---|---|---|
| 10 | 4 | 10.2 | 20 | 9 |
| 10 | 7 | 12.0 | 17 | 9 |
| 10 | 16 | 12.2 | 13 | 9 |

EXAMPLE 7

Additives prepared substantially according to Example 1 were mixed with coal and top dressed, i.e., laid on top of the coal in discrete batches and tested in the stoker furnace described in Example 4. The amount of additive mixed with the coal was 5% by weight and the amount of additive top dressed was 5% by weight. The results are given in Table 10.

TABLE 10

| Test | Exhaust Temp C. | $O_2$ | NO | CO | $CO_2$ | $SO_2$ | Normalized to 3% $O_2$ ppm $SO_2$ | NOx |
|---|---|---|---|---|---|---|---|---|
| 1 | 670 | 11.2 | 112 | 1000 | 7.5 | 550 | (1005) | (203) |
| 2 | 740 | 8.7 | 100 | 750 | 10.5 | 250 | (360) | (144) |
| 3 | 740 | 10.2 | 90 | 400 | 9.0 | 380 | (628) | (148) |

EXAMPLE 8

Additives were prepared substantially according to Example 1. 10 percent $CaCO_3$ by weight of additive was included in the additive. This mixture was added to burning coal in discrete batches in the stoker furnace described in Example 4. An amount of the additive equivalent to 20 percent of the coal input was added during the first hour, 10 percent during the second hour and 2.5 percent each hour thereafter. The results are given in Tables 11 and 12.

TABLE 11

| Time Additive Placed | Amount Additive lb. | Time of Reading | $O_2$ % | NO ppm | CO ppm | $CO_2$ % | $SO_2$ ppm | Exhaust Temp C. |
|---|---|---|---|---|---|---|---|---|
| — | — | 11.07 | 10.1 | 152 | 220 | 9.5 | 635 | 650 |
| 11.12 | 2.2 | | | | | | | |
| | | 11.15 | 11.2 | 80 | 500 | 7.5 | 140 | |
| | | 11.30 | 11.0 | 125 | 150 | 8.5 | 350 | |
| | | 11.40 | 11.0 | 135 | 150 | 8.5 | 450 | |
| 11.15 | | | 11.2 | 80 | 500 | 7.5 | 140 | |
| 11.44 | 2.2 | | | | | | | |
| | | 11.49 | 11.0 | 125 | 1000 | 8.7 | 150 | |
| | | 12.03 | 11.2 | 130 | 600 | 8.7 | 300 | |
| | | 12.12 | 10.0 | 130 | 300 | 9.0 | 380 | |
| 12.12 | 1.1 | | | | | | | |
| | | 12.17 | 10.0 | 100 | 1000 | 8.7 | 230 | |
| | | 12.42 | 10.0 | 120 | 1000 | 9.0 | 410 | |
| 12.42 | 1.1 | | | | | | | |
| | | 12.50 | 10.0 | 100 | 300 | 9.0 | 280 | |
| | | 13.08 | 10.2 | 120 | 250 | 8.7 | 360 | |
| 13.12 | 0.44 | | | | | | | |
| | | 13.16 | 10.0 | 120 | 250 | 9.0 | 300 | |
| | | 13.25 | 9.8 | 120 | 60 | 9.0 | 380 | |
| | | 13.55 | 10.0 | 120 | 60 | 9.0 | 420 | |
| 14.12 | 0.44 | | | | | | | |
| | | 14.15 | 10.0 | 100 | 60 | 9.0 | 300 | |
| | | 14.30 | 10.8 | 125 | 60 | 9.0 | 400 | |

TABLE 12

| Additive/ Coal % | Duration Hours | $SO_2$ % Average Removal | NOx % Average Removal |
|---|---|---|---|
| 20 | 1 | 57 | 20 |
| 10 | 1 | 49 | 27 |
| 2.5 | 2 | 42 | 20 |

As indicated, $SO_2$ and NOx reductions obtained by mixing the additive with the coal and by top dressing were similar. Apparently, addition of $CaCO_3$ has no significant effect of the ability of the additive to reduce $SO_2$ and NOx emissions.

The stoker furnace tests also indicate that when combustion of the coal on the stoker grate improved, i.e., the temperature raised and the $O_2$ concentration lowered, the $SO_2$ and NOx emissions decreased for a given amount of additive. Consequently, increased performance could be expected in full scale furnaces where higher combustion temperatures would be expected.

When sodium chloride (NaCl) or other alkali metal salts which as potassium chloride (KCl) or lithium chloride (LiCl) are present in the reaction zone of a coal flame, nitrogen oxides (NOx) emissions are substantially reduced. Sulfur dioxides ($SO_2$) emissions are also reduced by alkali metal salts but the major effect of alkali metal salts is on NOx emissions. Applicants have found that the effect of the alkali metal salts on NOx appears to be gas phase catalytic, since the NOx reduction does not correspond with any increase in the nitrogen content of the ash. The $SO_2$ removal does appear to result from a direct reaction with the sodium forming sodium sulfate ($Na_2SO_4$). Sodium chloride can be either mixed with the coal, mixed with the combustion air or injected into the base of the flame, with the essential factor being the presence of the alkali salt in the reaction zone.

EXAMPLES 9–15

Coal was combusted in accordance with the combustion process of this invention in a pulverized coal facility 10 comprising an advanced combustion research facility or vertical tunnel combustion furnace as shown in FIG. 1. The combustor 12 of the pulverized coal facility (advanced combustion facility) 10 of FIG. 1 is vertically-fired. The combustor 12 has a 1.5 feet internal diameter and is composed of combinations of one foot long modules 13 and 14. These modules 12 and 14 are either refractory-lined or water-cooled. The combustion gas temperature profile can be varied by using different combinations of these refractory-lined or water-cooled modules 13 and 14. The nominal length of this vertical tunnel furnace 10 is 10 feet. By firing in the vertical direction, solid particle dropout and accumulation in the combustion furnace 10 is minimized.

Pulverized coal is fed from a Vibra-type screw feeder and is conveyed by the primary air into the pulverized coal burner 16. Mixing intensity of the burner 16 can be varied by changing the amount of primary air and also the register settings of the burner 16. Combustion air is supplied by a fan 18 or blower 20. The majority of the air flow passes through an air preheater 22 which increases the air temperature 600 degrees F. A small portion of the air bypasses the air preheater 22 and is either used as cold primary air or mixed with appropriate amounts of preheated air to produce primary air flows of varying temperature levels. Secondary and staged air flows use exclusively the preheated air. Flue gas comprising effluent combustion gases are passed through a heat exchanger 24 before being passed through the baghouse and stack. Prescribed amounts of flud gas can also be extracted from downstream of the baghouses and fed to all combustion air streams through a flue gas recirculation fan 26. Flow rates of all air and flue gas streams are monitored with Venturi flow meters 28-32. All furnace modules 13 and 14, be they refractory-lined or water-cooled, are water-jacketed. Cooling water flow rates and the temperatures of the water inlet 34 and outlet 36 are monitored for the characterization of furnace heat absorption profile.

Various additives were added during the combustion of coal to determine their effect on reducing (removing) nitrogen oxides as shown in Table 13 below. The results of the tests in Table 13 below indiate that alkali metal salts comprising sodium chloride (NaCl) and potassium chloride (KCl) behave similarly in reducing (removing) nitrogen oxides and that sodium carbonates ($Na_2CO_2$) have little effect on NOx emissions. The test results also indicated that alkali metal salts should be present in the reaction zone of the flame for best results in reducing NOx. It was earlier observed that sodium chloride had very little effect on NOx emissions during the combustion of natural gas (methane) in contrast to the combustion of solid carbonaceous material, such as coal. Analysis of the coal ash/sodium solid collected at the furnace exit, when sodium chloride was added during the combustion of coal, did not reveal any molecular nitrogen. Therefore, the molecular nitrogen was probably emitted as a gas.

The preceding factors taken together suggest the alkali salts act as a gas phase catalyst for reactions such as:

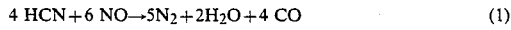

$$4 \text{ HCN} + 6 \text{ NO} \rightarrow 5N_2 + 2H_2O + 4 \text{ CO} \qquad (1)$$

These reactions occur naturally in coal flames but are in competition with oxidation reactions such as:

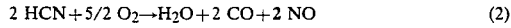

$$2 \text{ HCN} + 5/2 \text{ O}_2 \rightarrow H_2O + 2 \text{ CO} + 2 \text{ NO} \qquad (2)$$

Normally under oxidizing conditions, reaction (2) is much faster than reaction (1). The role of the alkali salts may be to accelerate the rate of reaction (1) so that the rate is faster than reaction (2). These reactions explain why: (a) NOx reduction occurs without a nitrogen reaction product in the solid; (b) alkline metal salts have almost no effect with natural gas (methane) combustion (HCN is not normally produced when burning natural gas); and (c) the importance of the alkali salt being present in the reaction zone during the combustion of coal.

TABLE 13

| | NOx Reduction as a Function of Compound Used | | | |
|---|---|---|---|---|
| Additive | Initial NOx ppm | Final NOx ppm | Weight % Additive/ Coal | Percent NOx Reduction |
| 25% $MnO_2$ | | | | |

TABLE 13-continued

| | NOx Reduction as a Function of Compound Used | | | |
|---|---|---|---|---|
| Additive | Initial NOx ppm | Final NOx ppm | Weight % Additive/ Coal | Percent NOx Reduction |
| 25% $Fe_2O_3$ 50% NaCl 55% $MnO_2$ | 630 | 480 | 10 | 24 |
| 45% $Fe_2O_3$ | 650 | 650 | 5 | 0 |
| 100% NaCl | 620 | 400 | 5 | 35 |
| 100% KCl | 650 | 450 | 5 | 31 |
| 100% $Na_2CO_3$ | 650 | 650 | 6 | 0 |
| 100% $NaHCO_3$ | 650 | 650 | 6 | 0 |
| 100% $CaCl_2$ | 650 | 650 | 10 | 0 |

EXAMPLE 16

Five percent NaCl/coal by weight was injected into a $0.5 \times 10^6$ Btu/hr pilot scale pulverized coal furnace of the type shown in FIG. 1. The furnace initially contained 640 ppm NOx and 3000 ppm $SO_2$. This injection rate of NaCl corresponded to 3.23 moles Na/moles NO and 0.33 moles $Na_2$/moles S. With this injection rate, 28% of the NO (from 640 down to 470 ppm) was removed.

EXAMPLE 17

A mixture of 5% NaCl+5% $CaCO_3MgCO_3$/coal by weight was injected into a $0.5 \times 10^6$ Btu/hr pilot scale pulverized coal furnace of the tpye shown in FIG. 1. The furnace initially contained 640 ppm NOx and 3000 ppm $SO_2$. This injection rate corresponds to 3.23 moles Na/moles NO, 0.33 moles $Na_2$/moles S and 0.21 moles Ca/moles S. With this injection rate, 28% NO (from 640 ppm to 470 ppm) was removed and 20% of the $SO_2$ (from 2900 to 2300 ppm) was removed.

EXAMPLES 18-22

Coal combustion tests were conducted adding different amounts of sodium chloride to show its effect on nitrogen oxides and the composition of the coal ash. Table 14 shows the effect of injecting sodium chloride (NaCl) on the NOx and on the carbon (C), hydrogen (H), nitrogen (N), and sodium (Na) levels in the ash. The sodium level in the ash without a sodium chloride-containing additive was 1.3%, while with 5% NaCl addition the sodium level in the ash was 9.2%. For the same five samples, Table 15 compares the measured levels on nitrogen in the ash with the nitrogen levels expected in the NOx removed was present in the ash. The addition of NaCl can affect the nitrogen content of the ash in two ways. First, the extra inerts dilute the nitrogen present in the ash from uncombusted coal. Secondly, if the NOx removed from the flame is captured in the ash, the ash nitrogen level would increase. For example, the addition of 5% NaCl should dilute the organic nitrogen left in the ash from 0.3% to 0.18%, while if all the NOx removed was found in the ash a 1.8% increase in nitrogen would be measured. The ash sample from the case with 5% NaCl addition had only 0.1% nitrogen in the ash, implying that the NOx removed from the flame is not present in the ash but present in another gaseous form, mainly molecular nitrogen.

TABLE 14

Effect of NaCl Addition on the Sodium and Nitrogen Content of the Ash

| Additive | Weight % Additive/ Coal | Initial NOx ppm | Final NOx ppm | % NOx Reduction | % C | % H | % N | % Na |
|---|---|---|---|---|---|---|---|---|
| 0 | 0 | 650 | 650 | 0 | 16.77 | .02 | .3 | 1.3 |
| NaCl | 2.5 | 650 | 625 | 6.7 | 11.66 | .03 | .14 | 3.4 |
| NaCl | 5.0 | 720 | 520 | 28.0 | 8.27 | .06 | .10 | 9.2 |
| 0 | 0 | 300 | 300 | 0 | 23.91 | .03 | .42 | 4.6 |
| NaCl | 5.0 | 490 | 260 | 47.0 | 15.65 | .04 | .26 | 8.2 |

TABLE 15

Nitrogen Mass Balance

| Weight % NaCl/Coal | Organic Nitrogen Expected in Ash % Weight | Nitrogen Expected if NOx Reduction Due to Reaction With Solids % Weight in Ash | Total Possible Nitrogen % Weight in Ash | Measured Nitrogen % Weight in Ash |
|---|---|---|---|---|
| 0 | 0.3 | 0.3 | 0.3 | 0.3 |
| 2.5 | 0.22 | 0.6 | 0.82 | 0.14 |
| 5.0 | 0.18 | 1.8 | 1.98 | 0.1 |
| 0 | 0.42 | 0.42 | 0.42 | 0.42 |
| 5.0 | 0.26 | 1.8 | 2.06 | 0.26 |

In Table 15, where no additive was use, then the measured amount of organic nitrogen is indicated. If an additive comprising NaCl was used, then the expected organic nitrogen is based on the measured amount of nitrogen without NaCl diluted by NaCl weight added to inerts. The nitrogen expected if NOx reduction due to reaction with solids, assumes all the NOx that is removed is present in the ash as NaCN, NaNO$_2$, etc. The total possible nitrogen is the total of the two previous columns.

EXAMPLE 23

Experiments were conducted in a 0.5×10$^6$ Btu/hr pulverized coal facility similar to FIG. 1. In the pulverized facility the sodium chloride (NaCl) injection rate over the range from 1% to 6% NaCl/coal by weight. The results are shown in FIG. 2. FIG. 2 shows an approximately linear relationship between the amount of NaCl added and the nitrogen oxide (NOx) reduction. Also shown in FIG. 2 are the results achieved when firing the furnace on natural gas (methane) rather than coal. Although the initial NOx levels were approximately the same for both fuels, very little effect on NOx was observed when burning natural gas.

EXAMPLE 24

Testing was conducted in a 0.5×10$^6$ Btu/hr pulverized coal facility similar to FIG. 1. The initial NOx concentration in the 0.5×10$^6$ Btu/hr pilot combustor was varied by staging the combustion air. Staging of the combustion air was performed by diverting a fraction of the air, up to 30%, to downstream of the main flame. The influence of the initial nitrogen oxide (NOx) concentration on the NOx removal effectiveness of sodium chloride (NaCl) is shown in FIG. 3. As the initial NOx concentration was reduced from 990 ppm to 150 ppm, the amount (ppm) of NOx removed also decreased. However, the decrease in the initial NOx concentration was greater than the decrease in NOx removed, therefore, an increase in the percent NOx reduction occurred as the initial NOx concentration was lowered.

EXAMPLES 25-34

Coal was burned by direction combustion in a stoker furnace with different additives mixed with the coal to determine the effect of the additives on reducing SOx adn NOx. The results are indicated in Table 16 below. The additives tested included: iron manganese alloy (FeMn), manganese dioxide (MNO$_2$), ferric oxide (Fe$_2$O$_3$), sodium chloride (NaCl), dolomite, and zinc oxide (ZnO). In Table 4, the left hand number in each row is the percentage of total additives mixed with the coal based on the total weight of the coal. Subsequent numbers in each row indicate the percentage of each additive based upon the total weight of the indicated additives.

TABLE 16

Average NOx and SOx Reductions Achieved in the Stoker Tests

| Percent Additives Based on Weight of Coal | Additives | Average Percent SOx Reduction | Average Percent NOx Reduction |
|---|---|---|---|
| 1.25 | 100% FeMn | 0 | 0 |
| 1.25 | 100% MnO$_2$ | 0 | 0 |
| 5 | 33% MnO$_2$ 22% Fe$_2$O$_3$ 45% NaCl | 56 | 30 |
| 5 | 25% FeMn 25% Fe$_2$O$_3$ 50% NaCl | 50 | 37 |
| 5 | 40% FeMn 40% Fe$_2$O$_3$ 20% NaCl | 26 | 34 |
| 5 | 50% NaCl 50% dolomite | 26 | 38 |
| 5 | 100% NaCl | 37 | 37 |
| 5 | 25% FeMn 25% Fe$_2$O$_3$ 49% NaCl 1% ZnO | 50 | 37 |
| 5 | 25% FeMn 25% Fe$_2$O$_3$ 50% NaCl 90% > 50 mesh | 51 | 17 |
| 5 | 12.5% FeMn 12.5% Fe$_2$O$_3$ 25% NaCl 50% Dolomite | 50 | 37 |

The Induco B coal conditioners formulation (additive) comprising an alkali metal salt, such as sodium chloride (NaCl), is a much simpler, lower-cost additive than prior art coal conditioners. The Induco B coal conditioner can be particularly useful for utility boilers and furnaces including cyclone boilers and brown coal boilers. Cyclone boilers are very amenable utility furnaces for NOx control using the Induco B formulation. Coal fired utility boilers with a cyclone furnace design represent more than 26,000 megawatts of installed capacity and are a source of approximately 18 percent of utility NOx emissions nationwide. In this regard, cyclone boilers represent a unique NOx control problems that is not readily solved with conventional combustion modification techniques. The very intense combustion in the cyclone at high flame temperatures results in NOx emission, often in excess of 1,000 ppm (1.4 lb/MMBtu). The air-rich environment in the cyclone leads to high fuel nitrogen conversion and thermal NOx formation. The high heat release rate per unit area required to maintain slag flow within the combustor also enhances the formation of thermal NOx. Although tangentially-fired and wall-fired dry bottom units may have several retrofit NOx control options from which to choose, e.g. low-NOx burners, overfire air ports, burners out-of-service, retrofit NOx control options have not been very successful or commmercially demonstrated for cyclone units. While options such as re-burning and selective catalytic reduction NOx controls may be useful, their high capital and/or operating costs are a drawback for units already 20-30 years of age.

The Induco B coal conditioners can provide a simple, low-cost means of reducing NOx emissions from about 30% to about 40% in cyclone boilers. The tendency of Induco B coal conditioners (additives) to lower the melting temperature of coal ash may also be a positive factor for cyclone furnaces since slag flow is desired.

Moreover, the German NOx level of 120 ppm at 3% $O_2$ cannot, in general, be achieved with currently available NOx control systems based on combustion modifications alone. One method of achieving the 120 ppm NOx standard would be to combine injection of small quantities of Induco B coal conditioner (1-5%) with advanced combustion modifications. The process and system offers considerable economic advantages to prior art SCR techniques. Furthermore, the amount of Inducto B additive required to yield the 40-50 ppm NOx removal is small.

Among the many advantages of the novel combustion process are:
1. Outstanding pollution control.
2. Superior removal of sulfur oxides.
3. Excellent removal of nitrogen oxides.
4. Improved burning of coal.
5. Safe.
6. Clean.
7. Economical.
8. Easy to use.
9. Efficient.
10. Effective.

Although embodiments of the invention have been shown and described, it is to be understood that various modifications and substitutions, as well as rearrangement of elements, components, and process steps, can be made by those skilled in the art without departing from the novel spirit and scope of this invention.

What is claimed is:

1. A combustion process, comprising the steps of:
combusting substantially solid carbonaceous material selected from the group consisting of coal, lignite, peat, oil shale, tar sands, uintaite, and biomass in the presence of a Group 1a alkali metal salt selected from the group consisting of potassium chloride, sodium chloride, lithium chloride, potassium bromide, lithium bromide, and sodium bromide, and in the absence of recycled flue gases;
emitting nitrogen oxides selected from the group consisting of nitric oxides and nitrogen dioxides during said combustion; while simultaneously
converting a substantial amount of said nitrogen oxides to molecular nitrogen during said combustion.

2. A combustion process in accordance with claim 1 wherein sulfur oxides selected from the group consisting of sulfur dioxides and sulfur trioxides are emitted during said combustion and a substantial amount of said sulfur oxides are converted to sulfate-containing compounds during said combustion.

3. A combustion process in accordance with claim 1 wherein said carbonaceous material is also combusted in the presence of an oxide of a metal selected from the group consisting of zinc, copper, nickel, calcium, and cobalt.

4. A combustion process in accordance with claim 1 wherein said carbonaceous material is further combusted in the presence of an iron-containing compound selected from the group consisting of FeO, $Fe_2O_3$, $Fe_3O_4$, and FeMn.

5. A combustion process, comprising the steps of:
directly combusting coal with a flame in a reaction zone in the presence of air and an additive comprising sodium chloride;
producing heat from said combustion while simultaneously emitting effluent combustion gases comprising nitrogen oxides selected from the group consisting of NO and $NO_2$; and
converting a substantial amount of said nitrogen oxides to molecular nitrogen during said combustion to substantially purify said combustion gases.

6. A combustion process in accordance with claim 5 including emitting sulfur oxides during said combustion, said sulfur oxides selected from the group consisting of sulfur dioxides and sulfur trioxides, and converting a substantial amount of said sulfur oxides to sulfate-containing compounds said combustion.

7. A combustion process in accordance with claim 5 wherein said additive further comprises an oxide of a metal selected from the group consisting of manganese, zinc, copper, nickel, calcium, and cobalt, to further purify said gases.

8. A combustion process in accordance with claim 7 wherein said additive further comprises an iron-containing compound selected from the group consisting of iron oxide, ferrous oxide, and an iron manganese alloy.

9. A combustion process, comprising the steps of:
directly combusting coal with a flame in the presence of air and an additive composition comprising: from about 20% to about 60% by weight sodium chloride, from about 5% to about 50% by weight of an oxide of manganese, and from about 10% to about 50% by weight iron oxide;
producing heat from said combustion while simultaneously emitting effluent combustion gases comprising sulfur dioxides and nitrogen oxides; and
substantially purifying said combustion gases by substantially removing and reducing said nitrogen oxides and sulfur oxides with said additive composition.

* * * * *